Feb. 28, 1939. J. J. MELLON Re. 21,017

POWER CONTROL FOR MACHINE TOOLS

Original Filed Jan. 7, 1935

INVENTOR.

James J. Mellon.

BY Slough and Coufield

ATTORNEY.

Reissued Feb. 28, 1939

Re. 21,017

UNITED STATES PATENT OFFICE 21,017

POWER CONTROL FOR MACHINE TOOLS

James John Mellon, Cleveland, Ohio, assignor to The Clark Controller Company, Cleveland, Ohio, a corporation of Ohio Original No. 2,065,820, dated December 29, 1936, Serial No. 686, January 7, 1935. Application for reissue August 15, 1938, Serial No. 225,076

22 Claims. (Cl. 192—144)

This invention relates to electric control systems and apparatus for controlling the operative movement of cyclically moving machine tools such, for example, as power presses.

The invention relates more particularly to control systems and apparatus for machines of the class referred to which are operatively driven by a continuously operating source of power such as a rotating electric motor. Such machines are coupled to the motor to start and operate them, and to stop them they are uncoupled from the motor and a brake is applied to bring them to rest.

In such cases it is desirable that the brake may be fully released before the clutch, coupling the machine to the motor, engages to start the machine, and that to stop the machine the clutch may be disengaged before the brake is applied; and that the machine may be started and stopped in a manner to prevent the operators thereof from injury and according to a work cycle that will insure efficient operation and maximum production from the machine.

Among the objects of the invention, therefore, are:

To provide an improved control means for controlling the brake and clutch of a power operated press or the like;

To provide an improved electric system and apparatus for controlling machines of the class referred to having a clutch and brake operated by mechanical power;

To provide, for machines of the class referred to having a brake and clutch operated by compressed air, an improved electric control system and apparatus for controlling the application of the compressed air to the brake and clutch;

To provide an improved electric control system and apparatus for power-driven machine tools of the class referred to, to prevent, in an improved manner, accidental unintended starting of the press from rest, and accidental unintended continuous operation of the press;

To provide an electric control system and apparatus for power-driven machines of the class referred to wherein an accidentally developed "ground" connection in the control system or in the electric supply mains leading thereto cannot initiate an operative movement of the machine nor continue it in unintended operation;

To provide generally an improved electric control system and apparatus for machine tools of the class referred to;

Other objects will be apparent to those skilled in the art to which my invention appertains.

My invention is fully disclosed in the following description taken in connection with the accompanying drawing in which.

Figure 3:
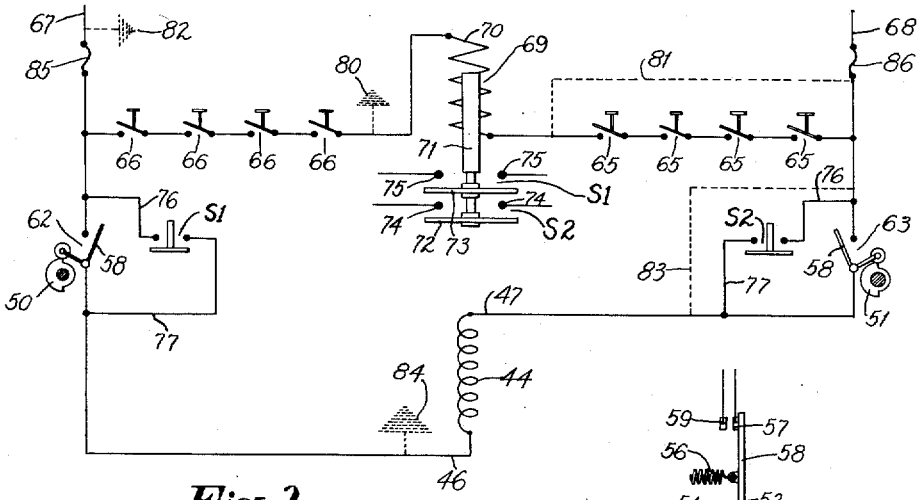
Fig. 3 is a diagrammatic view illustrating a system of electrical connections and apparatus which I may employ for controlling the press of Figs. 1 and 2 according to my invention.

Referring to the drawing, I have shown generally at 1 the main frame of a power press. In the upper part thereof is a transverse shaft 2 supported in suitable bearings in opposite portions of the frame 1 and having a plurality of cranks 3—3 and corresponding connecting rods 4—4 carrying on the lower ends thereof a head 5 guided for vertical reciprocatory movement in laterally disposed guideways 6—6. The frame is provided with a lower head or platen, 7, and punching dies, pressing dies or the like may be mounted on the heads 5 and 7 to operate on work pieces disposed therebetween in the usual manner.

Figure 1:
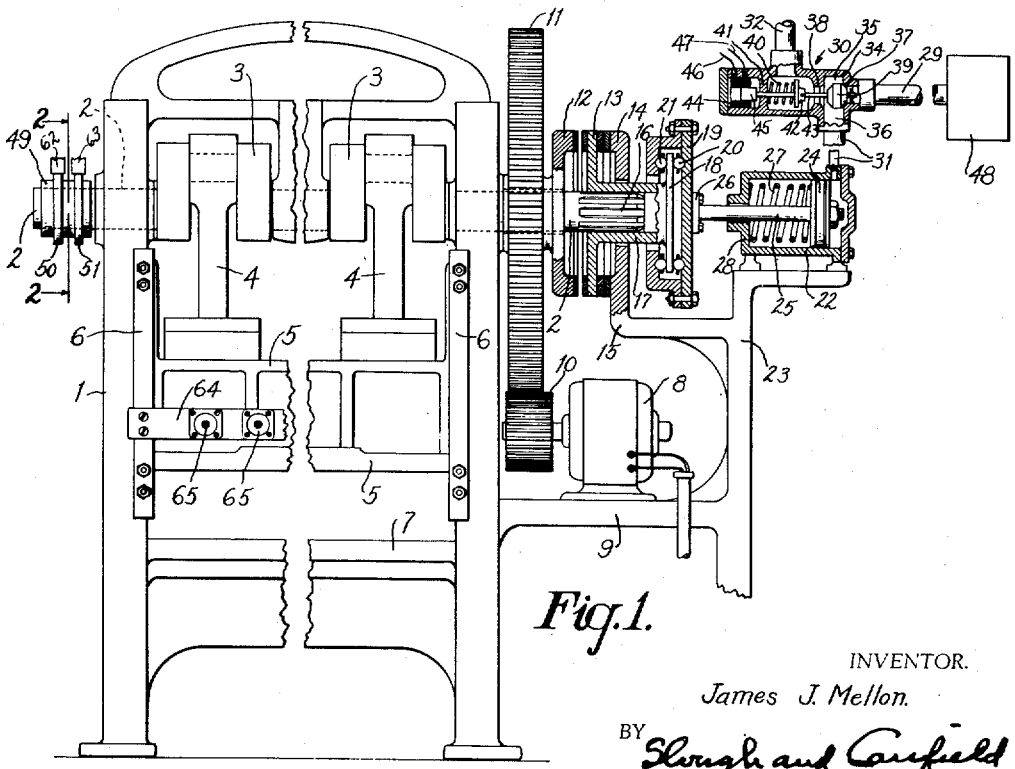
Fig. 1 is a front elevational view in simplified form of a power-driven press illustrating, in some respects, diagrammatically, the application of my invention thereto.

The press, as viewed in Fig. 1, may have any suitable width and may be driven by any necessary number of connecting rods 4—4, the figure being broken apart longitudinally to save space in the drawing.

To drive the machine, an electric motor 8 is supported upon a suitable bracket 9 and is adapted to be started and allowed to run continuously. A pinion 10 on the motor shaft meshes with a gear 11 normally running idle on the shaft 2 but adapted to be clutched to the shaft to drive it by a clutch now to be described. Secured to the gear 11 and rotating therewith is a clutch element 12; normally axially spaced therefrom is a clutch element 13 normally engaged with a brake element 14. These elements are illustrated diagrammatically in the drawing and their exact construction forms no essential part of the present invention. The brake element 14 is supported on a stationary frame 15 and the clutch element 13 is splined on the shaft 2, as at 16. When the clutch element 13 is moved on the splines 16 into engagement with the brake element 14, it will exert a braking action to stop the shaft 2; and when it is axially moved on the splines 16 to engage the clutch element 12, it will exert a frictional clutching action thereon and the rotating clutch element 12 will rotate the clutch element 13 and through the splines 16 will rotate the shaft 2.

Thus, by alternate axial movements of the clutch element 13, it may start the press shaft by power from the continuously rotating gear 11 or may stop the press by engagement with the brake element 14 on the stationary frame 15. To thus operatively shift the clutch element 13, the following mechanism is provided.

The clutch element 13 has a hub 17 and it is this portion of the clutch element which is splined to engage the splines 16 on the shaft and axially spaced from the clutch element 13 is a head 18 on the hub. The head 18 is enclosed within a housing 19 in which are also housed a pair of thrust bearings 20 and 21 of the roller or ball type engaging opposite sides of the head 18. A compressed air cylinder 22 is supported on a stationary bracket 23 and has thereon a piston 24 connected to a piston rod 25 extending out of the cylinder 22 and secured as at 26 to the housing 19. A spring 27 in the cylinder 22 reacts at one end upon the piston 24 and at the other end upon the end wall 28 of the cylinder, and thus resiliently thrusts the piston rod 25 and housing toward the right as viewed in the drawing causing the thrust bearing 21 to engage the head 18 and force the clutch element 13 into engagement with the brake element 14.

A conduit 29 leading from a reservoir 48 of compressed air and controlled by a valve device 30 to be described communicates with a conduit 31 which in turn communicates with the interior of the cylinder 22 on the side of the piston 24 opposite the spring 27. When air is admitted to the cylinder through the conduit 31 in a manner to be described, it will force the piston 24 toward the left as viewed in the drawing compressing the spring 27 and moving the housing 19 to cause the thrust bearing 20 to engage the head 18 and move it and the clutch element 13 therewith to cause the latter to engage the clutch element 12 to start the shaft 2 and the press.

When the valve device 30 is in its normal restored condition illustrated, the conduit 31 communicates with a discharge conduit 32 open to the atmosphere so that the spring 27 may move the piston 24 to discharge the air from the cylinder 22 and to cause the elements 13 and 14 to engage to stop the press in a manner that will now be clear.

Preferably, the valve device 30 is electrically actuated and constructed so that upon electric energization or actuation thereof, the conduit 29 will be connected with the conduit 31 for the purpose described and whereby upon de-energizing it the conduit 31 will be connected with the conduit 32 for the purposes described.

Any suitable construction of valve device 30 for this purpose may be employed. In the form illustrated in the drawing and which for simplicity of illustration is to a larger scale than the other parts of Fig. 1, I have shown a housing 34 having a chamber 35 therein communicating by a passageway 36 with the conduit 31, and communicating with the conduit 29 by a valve seat or port 37, and communicating with the conduit 32 by a valve seat or port 38. A valve element 39 is normally pressed upon the valve port 37 to close it by a spring 40 abutting at one end upon an abutment 41 in the housing and at its other end upon a collar 42 on a stem 43 connected to the valve element 39.

An electro-magnet comprising a winding 44 and a plunger 45 connected to the stem 43 is provided whereby when the winding 44 is energized by current supplied thereto through supply wires 46 and 47, the plunger 45 may be attracted and drawn into the winding 44 to pull the stem 43 in the direction to move the valve element 39 from its normal position in which it closes the port 37 and opens the port 38 to its operated position in which it closes the port 38 and opens the port 37. When the port 37 is closed and the port 38 is open, the cylinder 22 discharges to atmosphere by conduit 31, port 38, and conduit 32. When the port 38 is closed and the port 37 is open, fluid pressure is communicated from the source 48 to the cylinder 22 by conduit 29, port 37, and conduit 31. The electro-magnetic unit, comprising the winding 44 and the plunger 45 may be of any suitable construction.

By means of the apparatus thus far described, it will now be apparent that upon energizing the winding 44, compressed air will be admitted from the source to the cylinder 22 to successively disengage the brake and engage the clutch to start the press, and upon de-energizing the winding 44, communication will be established from the cylinder to the atmosphere and the spring 27 will discharge the air from the cylinder, and, successively, release the clutch and set the brake to stop the press.

To supply the compressed air any suitable apparatus may be provided and I have indicated diagrammatically at 48 any such source, preferably of the compressed air reservoir type.

Figure 2:
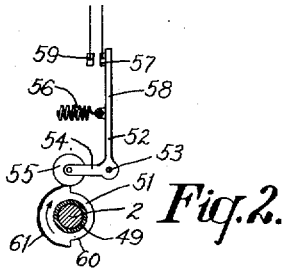
Fig. 2 is a cross-sectional view in semi-diagrammatic form taken approximately from the plane 2—2 of Fig. 1 illustrating a mechanically operated switch which I may employ.

At the left side of the machine as viewed in Fig. 1, the shaft 2 extends beyond the supporting frame 1 and a sleeve 49 secured to the shaft rotatably supports a pair of cams 50 and 51 for operating each a switch such as that illustrated in Fig. 2. The switch comprises a bell crank shaped arm 52 pivotally supported at 53, a generally horizontal arm 54 carrying a wheel type cam follower 55 engaging the camming surface of the cam 51, resiliently retained in contact therewith by a spring 56. A contact 57 on a generally vertically disposed arm 58 is moved to engage and disengage a contact 59. The cam 51 has portions 60 and 61 respectively of small and large diameter.

In the operation of the switch of Fig. 2, as the shaft 2 rotates, the cam follower 55 will ride on the portion 61 of the cam and hold open the contacts 57 and 59 and subsequently will ride down upon the portion 60 of the cam and permit the contacts to be closed by the spring 56.

The switch is shown generally diagrammatically in Fig. 2. Such switches are well known and any suitable construction may be employed in connection with a cam 51 having camming portions 60 and 61 suitably formed to time the operation of the contacts 57 and 59 in a manner and for a purpose to be described.

In the use of presses of this general type, the operators must put the work piece between the upper and lower heads 5 and 7 after the up-stroke of the press has begun and must finish this operation and remove their hands and arms to safe positions before the head 5 has descended. An electric control system to be described in connection with Fig. 3 for the air valve operating magnet 44 is provided, operating in connection with switches 62 and 63 and switch operating cams 50 and 51, respectively, to effect stopping of the press at or adjacent the top of its stroke; and in order that the press may not start down until all of the operators have all of their hands in safety positions, a plurality of push buttons is provided, two for each operator, and controlling the valve winding 44.

In Fig. 1, a pair of rails 64, respectively on the front and rear of the machine, and only the front one of which is shown, are supported on the press extending transversely thereof, and on the rails are mounted push button switches 65, those on the rear side of the machine being referred to by the reference numeral 66.

In Fig. 3, taken in connection with the other figures, I have illustrated diagrammatically, the said electric control system and control apparatus by which a press such as that described above may be operated.

At 44 I have reproduced the valve magnet winding as having current supply wires 46 and 47 connected respectively to current mains 67 and 68 through cam-operated switches 62 and 63, respectively. An electro-magnetic switch 69 is provided having a winding 70 and a plunger 71 operating two switches S2 and S1, the switches comprising movable switch elements 72 and 73 adapted when elevated by the plunger 71 to bridge stationary contacts 74—74 and 75—75. The winding 70 is energized across the mains 67 and 68 with the group of push buttons 65—65 interposed between the winding and the main 68 and the group of push buttons 66—66 interposed between the winding and the main 67.

The switches S1 and S2 respectively bridge or parallel the switches 62 and 63 and to simplify the drawing, the switches S1 and S2 have been reproduced in the diagram as being connected in parallel with the switches 62 and 63 by wires 76 and 77.

The operation of the press in connection with the diagram of Fig. 3 will now be described. It is assumed that the press is at the top of the stroke and is not operatively moving. The cams 50 and 51 are in the rotated positions to hold the switches 62 and 63 open. The push button switches 65 and 66 likewise are open. The control magnet winding 44 is therefore de-energized and the brake on the press is set. It is with the parts in this position that the work pieces may be changed in the press without danger to the operators. When each operator has finished his work, he places his hands on two of the push buttons 65 or 66, and these push buttons are so located that not only the operator's hands but his arms and other parts of his body will be out from under the path of the moving head 5 of the press.

When all the push buttons 65 and 66 have been closed, and not before, the winding 70 of the electro-magnetic switch 69 will be energized and will close the switches S1 and S2. Current may now flow from the main 67 to the main 68 through the switch S1, the winding 44, and the switch S2. The winding 44 being energized, compressed air will be admitted from the source 48 to the cylinder 22 to disengage the brake and engage the clutch to start the machine and thus to start the head of the machine downwardly. If either of the operators should remove a hand from either of the push buttons, the winding 70 will be de-energized opening the switches S1 and S2 and de-energizing the winding 44 and setting the brake and stopping the machine.

The cams 50 and 51 of the switches 62 and 63 have their cam faces 60 and 61 so formed and angularly positioned that at a predetermined point in the operating stroke of the machine, they will close the switches 62 and 63. As will now be apparent, this point in the stroke of the machine may be before, at, or after the moment at which the head 5 has reached the bottom of the stroke, and in any case may be at such a point that it will be safe for the operators to remove their hands from the push buttons without danger of injury. When the switches 62 and 63 have thus been closed by movement of the machine itself, the operators may remove their hands from the push buttons 65 and 66, thereby de-energizing the switch 69 and allowing the switches 61 and 62 to open, the control winding 44 being maintained energized through the switches 62 and 63.

The press continues to move, completing its operative stroke, if it has not already done so, and starting on the up stroke. When the press has reached a predetermined point in its up stroke likewise determined by the shape and angular position of the cam surfaces 60 and 61, the switches 62 and 63 will be operated to open, thereby de-energizing the winding 44 and causing the clutch to be disengaged and the brake to be engaged, stopping the machine.

The functioning of the machine and the safety to the operators provided for by the control system above described depends to a great degree upon the certainty and positiveness of operation of the clutch and brake.

If either the brake or the clutch should fail to engage or disengage positively and immediately, there is danger that the machine might stop unexpectedly; or when running might unexpectedly continue to run; or when at rest might unexpectedly start. In any such event, the operators would be exposed to the danger of bodily injury if at such time their hands were under or too near to the moving parts of the machine.

It is for this reason that I have employed, as an element of the safety control system described above, a clutch which has engageable driving parts of the pressure-friction type, and in an arrangement for safely, quickly and certainly engaging and disengaging them. Such a clutch is to be distinguished from the locked type of clutch utilizing teeth, jaws, pins or the like, in which type the transmission of power takes place through mechanically overlapping or interlocked parts, and which in some cases, are operated by links, levers, toggles and like mechanism. Such locked clutches tend to stick or to be locked in engagement by the power transmitted through them. On the other hand, a clutch which drives solely through friction surfaces held in driving engagement solely by directly applied pressure invariably ceases its driving engagement as soon as the pressure is relieved.

To utilize, for safety purposes, a clutch of this type, I have, as illustrated and described, arranged to supply the clutch engaging pressure to a fluid pressure cylinder from a fluid pressure storage reservoir under the control of an electromagnetic valve, which when unenergized exhausts the pressure from the cylinder. By this means, if the clutch engaging pressure should fail, or if the electric current controlling the valve should fail, the pressure holding the clutch engaged is thereby discontinued and the clutch inherently ceases to drive. The pressure is transmitted from the cylinder directly to the clutch friction surfaces and produces pressure friction thereat directly, and all jaws, pins, teeth, etc., and the linkages, levers, toggles, rods, etc., for engaging them, which would be necessary in the use of other types of clutches and other power means for operating them, together with the consequent liability of unsafe mal-functioning thereof, are avoided, and the maximum of safety is obtained.

Furthermore, I have employed a friction brake which is organized with the friction clutch in such manner that when either is engaged the other is with certainty disengaged. In the preferred form illustrated and described, when the movable element of the device is moved to disengage the clutch the same movable element also engages the brake, or when moved by air pressure to engage the clutch also disengages the brake. It is, therefore, impossible for the clutch and brake to be engaged at the same time, with resulting greater safety as regards unintended starting and stopping of the machine in the respects above noted.

By providing a spring to normally set the brake, any failure of fluid pressure or of electric current, as mentioned above, not only releases the clutch but causes the brake to set.

By arranging the brake spring to be direct acting, that is to say, arranging it so that its force acts directly to separate the engaged clutch surfaces and so that it does not first have to disengage teeth, jaws, pins, etc., its action is rendered positive and certain. Also, when the fluid pressure is applied to engage the clutch it must first build up to a pressure sufficient to overcome the brake-setting-spring, and thus the necessary pressure to positively engage the clutch is insured.

By such arrangement of clutch and brake, furthermore, a very slight movement is sufficient to release the brake and set the clutch or release the clutch and set the brake, and these parts therefore respond positively to the intentions of the operators.

By supplying the operating fluid pressure from a pressure reservoir, the system admits of the provision of great power for operating the clutch and brake but at the same time under the control of a simple safety electric system as above described, requiring such small current as to be safely and positively controlled by the operators' push button switches described.

By quickly exhausting the brake restoring and clutch operating fluid pressure-cylinder, the preferred exhaust being directly to atmosphere, the clutch is caused to disengage and the brake is caused to act immediately after the operating fluid pressure is cut off; and by supplying great actuating power from a storage reservoir, the brake is released and the clutch is engaged immediately. Thus operation of the control either to stop or start the machine results in immediate response, which add not only to safety but to rapid sequence of safe operations.

Again, by supplying two switches 62 and 63 in the supply mains for the control winding 44, and by placing some of the push buttons such as 65 between the winding 70 and one of the mains 68, and others of the push buttons, 66, between the winding 70 and the other supply main 67, the press is prevented from starting unexpectedly or from repeating its cycle continuously upon the accidental development of a ground connection in the main 67 or 68 supplying current to the control system, or in the circuits local to the control system itself.

For example, if only the push buttons 66 were employed, that is, if push buttons were provided only between one supply main such as 67 and the winding 70, the result would be the same as if dotted line connection 81 were provided instead of the push buttons 65. With such an arrangement, if a ground connection 80 should develop connecting one terminal of the winding 70 to the ground and a ground connection 82 connecting the main 67 to the ground were present or should subsequently develop, the winding 70 would thereby be connected to the mains 67 and 68, current flowing from the main 68 through the wire 81, winding 70 and to the ground at 80, and thence by ground to 82, and to the main 67, and the winding 70 would close the switches S1 and S2 and the press would unexpectedly start or if running would run continuously, and if this should occur unexpectedly operators at the press might be injured.

Again if only one of the cam operated switches were employed, such as the switch 62, the conditions would be the same as if a wire 83 bridged the switch 63. With such an arrangement, if a ground connection 84 should develop connecting one terminal of the winding 44 to the ground, and then a ground connection 82 should be present or develop, current could flow from the main 68 to the wire 83, winding 44, and to the ground at 84, and through the ground to 82, and thence to the main 67, thus permanently connecting the winding 44 across the mains and causing the press to not only unexpectedly start but to operate continuously, repeating its cycle, and possibly injuring the operators.

But, by the above described arrangement whereby push buttons are disposed between the winding 70 and the supply mains 67 and 68, and whereby the supply mains are opened by cam operated switches 62 and 63, there is no place in the system where the occurrence of an accidental ground connection can cause the machine to unexpectedly start or to repeat its cycle unexpectedly. Any other combination of grounds which can develop and which might conceivably effect energization of the control winding 44 or the winding 70 of the switch 69 will provide a short circuit connection between the mains 67 and 68 which would blow fuses 85 or 86 which are commonly employed. Thus the operators are at all times protected from accidental starting or accidental repeating of the cycle of the press.

When it is desired to effect a so-called inching movement of the head 5 in setting up the press for work, the push button switches 65 and 66 may be of the type adapted to be locked in the closed position and all of them may be so locked except one and this switch may be operated by a foreman or other operator in charge of the work, and by momentarily closing such push button, a short interval engagement of the clutch may be effected for inching purposes.

As an alternative method of effecting inching, all of the push buttons except one may be held closed by operators and the remaining push button momentarily closed by the man in charge of the work to momentarily engage the clutch to effect an inching operation.

My invention is not limited to the exact details of construction illustrated and described. Changes and modifications may be made in the embodiment of my invention illustrated and described hereinbefore without departing from the scope and spirit of my invention or sacrificing its advantages.

I claim:

1. In combination with a machine and a source of power for operatively cyclically moving it, a mechanically operable clutch for coupling the machine to the source to move it, a mechanically operable brake for stopping the machine, a source of mechanical power for operating the brake and clutch comprising a device operable by fluid pressure and a source of supply of fluid pressure and conduit means communicating with the source and the device, control means comprising an electrically actuatable valve controlling flow through the conduit means and manually controlled means controlling the electrically actuatable valve to effect operation of the brake to release the machine and operation of the clutch to start it, and means rendering the electrically actuatable valve operable by the machine at a predetermined point in its cycle to effect operation of the clutch to uncouple the machine from the source and operation of the brake to stop it.

2. In combination with a machine and a source of power for operatively cyclically moving it, a clutch for coupling the machine to the source to move it, a brake for stopping the machine, a source of mechanical power for operating the brake and clutch comprising a device operable by fluid pressure and a source of supply of fluid pressure and conduit means communicating with the source and the device, control means comprising an electrically actuatable valve controlling fluid flow through the conduit means and manually controlled means controlling actuation of the valve to effect operation of the brake to release the machine and operation of the clutch to initiate movement of the machine, means operable by movement of the machine at a predetermined point in its cycle to maintain control of the valve to continue movement of the machine initiated by the manually controlled means, and means rendering the electrically actuatable valve operable by the machine at another predetermined point in its cycle to effect operation of the clutch to uncouple the machine from the source and operation of the brake to stop it.

3. In combination with a machine and a source of power for operatively cyclically moving it, a mechanically operable clutch for coupling the machine to the source to move it, a mechanically operable brake for stopping the machine, a source of mechanical power for operating the brake and clutch comprising a device operable by fluid pressure and a source of supply of fluid pressure and conduit means communicating with the source and the device, control means comprising an electrically actuatable valve controlling fluid flow through the conduit means, an electrically controlled switch having contacts controlling the electrically actuatable valve, and manually controlled means controlling the electrically controlled switch to effect actuation of the valve to effect operation of the brake to release the machine and operation of the clutch to initiate movement thereof, a switch having means rendering it operable by movement of the machine at a predetermined point in its cycle to cause it to maintain said actuation of the electrically actuatable valve to effect continued movement of the machine, and means for operating the said machine-operable switch by movement of the machine at another point in its cycle to control actuation of the electrically actuatable valve to effect operation of the clutch to uncouple the machine from the source and operation of the brake to stop it.

4. In combination with a machine and a source of power for operatively cyclically moving it, a mechanically operable clutch for coupling the machine to the source to move it, a mechanically operable brake for stopping the machine, a source of mechanical power for operating the clutch and brake, control means therefor comprising an electrically actuatable means, a pair of current supply means for supplying current to the electrically actuatable means, a manually controlled switch between each supply main and said electrically actuatable means for controlling the latter, to effect when jointly operated, operation of the electrically actuatable means to effect application of mechanical power to operate the brake to release the machine and operate the clutch to start the machine, and either of said switches adapted when restored to restore the electrically actuatable means.

5. In combination with a machine and a source of power for operatively cyclically moving it, a mechanically operable clutch for coupling the machine to the source to move it, a mechanically operable brake for stopping the machine, a source of mechanical power for operating the clutch and brake comprising a device operable by compressed air and a source of supply of compressed air and conduit means communicating with the source and the device, control means therefor comprising an electrically controlled valve controlling the compressed air conduit, a pair of current supply mains for supplying current to the electrically controlled valve, a manually controlled switch between each supply main and said electrically controlled valve for controlling the latter, to effect when jointly operated application of compressed air to the device to operate the brake to release the machine and operate the clutch to start the machine, and either of said switches adapted when restored to interrupt actuation of the electrically controlled valve to prevent accidental release of the brake and accidental operation of the clutch and accidental operation of the machine upon accidental development of a ground connection to said electrically controlled valve.

6. In combination with a machine tool, a source of power for operatively cyclically moving it, a mechanically operable clutch for coupling the machine to the source to move it, a mechanically operable brake for stopping the machine, a source of mechanical power for operating the brake and clutch, control means therefor comprising an electrically actuatable means, a pair of current supply mains for supplying current to the electrically actuatable means, manually controlled means controlling current to the electrically actuatable means to effect application of power to the brake and clutch to release the brake and engage the clutch to start the machine, a pair of switches respectively controlling the pair of supply mains, the switches having means operable by movement of the machine at a predetermined point in its cycle to open the switches, and either switch upon opening interrupting current to the electrically actuatable means to effect release of the clutch and engagement of the brake to stop the machine, and both switches upon opening preventing accidental release of the brake and accidental engagement of the clutch and accidental operation of the machine upon the accidental development of a ground connection to one of said supply mains and a local ground connection to the electrically actuatable means.

7. In combination with a machine tool, a source of power for operatively cyclically moving it, a mechanically operable clutch for coupling the machine to the source to move it, a mechanically operable brake for stopping the machine, a source of mechanical power for operating the brake and clutch comprising a device operable by compressed air and a source of supply of compressed air and a conduit communication with the source and the device, control means therefor comprising an electrically controlled valve controlling the conduit, a pair of current supply mains for supplying current to the electrically controlled valve, manually controlled means for controlling current to the electrically controlled valve to effect application of power to the brake and clutch to release the brake and engage the clutch to start the machine, a pair of switches respectively controlling the pair of supply mains, the switches having means operable by movement of the machine at a predetermined point in its cycle to open the switches, and either switch upon opening interrupting current to the electrically controlled valve to effect release of the clutch and engagement of the brake to stop the machine, and both switches upon opening preventing accidental release of the brake and accidental engagement of the clutch and accidental operation of the machine upon the accidental development of a ground connection to one of said supply mains and a local ground connection to the electrically controlled valve.

8. In combination with a machine and a source of power for operatively cyclically moving it, a mechanically operable clutch for coupling the machine to the source to move it, a mechanically operable brake for stopping the machine, a source of mechanical power for operating the clutch and brake comprising a device operable by compressed air and a source of supply of compressed air and conduit means communicating with the source and the device, control means therefor comprising an electrically controlled valve, controlling the compressed air conduit, a pair of current supply mains for supplying current to the electrically controlled valve, a manually controlled switch between each supply main and said electrically controlled valve for operating the latter, to effect when jointly operated application of compressed air to the device to operate the brake to release the machine and operate the clutch to start the machine and either of said switches adapted when restored to effect restoring of the electrically controlled valve to prevent accidental release of the brake and accidental operation of the clutch and accidental operation of the machine upon accidental development of a ground connection to one of said supply mains and a local ground connection to said electrically controlled valve.

9. In combination with a machine tool, a source of power for operatively cyclically moving it, a mechanically operable clutch for coupling the machine to the source to move it, a mechanically operable brake for stopping the machine, a source of mechanical power for operating the brake and clutch, control means therefor comprising an electrically actuatable means, a pair of current supply mains for supplying current to the electrically actuatable means, manually controlled means controlling current to the electrically actuatable means to effect application of power to the brake and clutch to release the brake and engage the clutch to start the machine, a pair of switches respectively controlling the pair of supply mains, the switches having means operable by movement of the machine at a predetermined point in its cycle to operate the switches and either switch upon operating controlling current to the electrically actuatable means to effect release of the clutch and engagement of the brake to stop the machine, and both switches upon operating preventing accidental release of the brake and accidental engagement of the clutch and accidental operation of the machine upon the accidental development of a ground connection to one of said supply mains and a local ground connection to the electrically actuatable means.

10. In combination with a machine tool, a source of power for operatively cyclically moving it, a mechanically operated clutch for coupling the machine to the source to move it, a mechanically operable brake for stopping the machine, a source of mechanical power for operating the brake and clutch comprising a device operable by compressed air and a source of supply of compressed air and a conduit communicating with the source and the device, control means therefor comprising an electrically controlled valve controlling the conduit, a pair of current supply means for supplying current to the electrically controlled valve, manually controlled means controlling current to the electrically controlled valve to effect application of power to the brake and clutch to release the brake and engage the clutch to start the machine, a pair of switches respectively controlling the pair of supply mains, the switches having means operable by movement of the machine at a predetermined point in its cycle to operate the switches, and either switch upon operating controlling current to the electrically controlled valve to effect release of the clutch and engagement of the brake to stop the machine, and both switches upon operating preventing accidental release of the brake and accidental engagement of the clutch and accidental operation of the machine upon the accidental development of a ground connection to one of said supply mains and a local ground connection to the electrically controlled valve.

11. In combination with a machine and a source of power for operatively cyclically moving it, a mechanically operable clutch for coupling the machine to the source to move it, a mechanically operable brake for stopping the machine, a source of mechanical power for operating the brake and clutch, control means therefor comprising an electrically actuatable means, a pair of current supply mains for supplying current to the electrically actuatable means, a manually controlled switch between each supply main and said electrically actuatable means for controlling the latter to effect when jointly operated, operation of the brake to release the machine and engagement of the clutch to start the machine, and either of said switches adapted when restored to interrupt actuation of the electrically actuatable means to prevent accidental release of the brake and accidental engagement of the clutch and accidental operation of the machine upon accidental development of a ground connection to one of said supply mains and a local ground connection to said electrically actuatable means.

12. In a safety control system for a machine tool or the like of the type having a cyclically movable machine element and a continuously running motor for driving it, a reservoir source of stored fluid pressure, a fluid pressure cylinder and a piston therein, one of which is stationarily supported and the other of which is rectilinearly reciprocable, conduit means effecting communication between the reservoir and the cylinder, a normally restored electro-magnetically operable valve comprising an operating winding and controlling the conduit means and when in operated condition admitting fluid pressure to the cylinder to effect a forward reciprocation of the reciprocable element and when in normal restored condition opening an exhaust from the cylinder, spring means for effecting an immediate quick return reciprocation when the exhaust is open and immediately exhausting the cylinder, circular friction clutch elements and circular friction brake elements, the clutch elements being movable axially into engagement and the brake elements being movable axially out of engagement by said forward reciprocation and the clutch elements being then held in pressure driving engagement solely by action of the fluid pressure in the cylinder and means to transmit power of the motor to the machine element to drive it through the pressure engaged clutch elements, the friction brake elements being movable axially into engagement and the clutch elements being movable axially out of engagement by said spring-means-effected return reciprocation upon exhausting of the cylinder, the brake elements being then held in pressure braking engagement solely by action of the spring means, means to effect a braking action upon the machine element through the pressure engaged brake elements to stop the machine, a source of electric current, a plurality of operators' contactors and electric circuit means controlled thereby to effect energization of the valve winding by current from the source, only when all of the contactors are operated, means moved by the machine element and switch means operated thereby and electric circuit means controlled by the switch means to automatically maintain the valve winding energized and the valve operated independently of the contactors after the machine element has moved through a predetermined portion of a cycle and to effect de-energization of the winding and restoring of the valve when it has substantially completed the cycle.

13. In a safety control system for a machine tool or the like of the type having a cyclically movable machine element and a continuously running motor for driving it, a reservoir source of stored fluid pressure, a fluid pressure cylinder and a piston therein, one of which is stationarily supported and the other of which is rectilinearly reciprocable, conduit means effecting communication between the reservoir and the cylinder, a normally restored, electro-magnetically operable valve comprising an operating winding and controlling the conduit means and when in operated condition admitting fluid pressure to the cylinder to effect a forward reciprocation of the reciprocable element and when in normal restored condition opening an exhaust from the cylinder to atmosphere, spring means for effecting an immediate quick return reciprocation when the exhaust is open and immediately exhausting the cylinder, circular friction clutch elements, and circular friction brake elements, the clutch elements being movable axially into engagement and the brake elements being movable axially out of engagement by said forward reciprocation and the clutch elements being then held in pressure driving engagement solely by direct rectilinear action of the fluid pressure in the cylinder, and means to transmit power of the motor to the machine element to drive it through the pressure engaged clutch elements, the friction brake elements being movable axially into engagement and the clutch elements being movable axially out of engagement by said spring-means-effected return reciprocation upon exhausting of the cylinder, the brake elements being then held in pressure braking engagement solely by direct rectilinear action of the spring means, means to effect a braking action upon the machine element through the pressure engaged brake elements to stop the machine, a source of electric current, a plurality of operators' contactors and electric circuit means controlled thereby to effect energization of the valve winding by current from the source only when all of the contactors are operated, cam means moved by the machine element and switch means operated thereby and electric circuit means controlled by the switch means to automatically maintain the valve winding energized and the valve operated independently of the contactors after the machine element has moved through a predetermined portion of a cycle and to effect de-energization of the winding and restoring of the valve when it has substantially completed the cycle.

14. In a safety control system for a machine tool or the like of the type having a cyclically movable machine element and a continuously running motor for driving it, a reservoir source of stored fluid pressure, a fluid pressure cylinder and a piston therein, one of which is stationarily supported and the other of which is rectilinearly reciprocable, conduit means effecting communication between the reservoir and the cylinder, a normally restored electro-magnetically operable valve comprising an operating winding and controlling the conduit means and when in operated condition admitting fluid pressure to the cylinder to effect a forward reciprocation of the reciprocable element and when in normal restored condition opening an exhaust from the cylinder, spring means for effecting an immediate quick return reciprocation when the exhaust is open and immediately exhausting the cylinder, a clutch and brake comprising circular axially movable clutch and brake friction elements, the clutch element being arranged to be moved into pressure friction engagement and be held in engagement solely by the action of the fluid pressure effecting said forward reciprocation, and arranged to then effect transmission of motor power to the machine element to drive it, the brake element being arranged to be moved into engagement and held in engagement solely by the action of the said spring means upon effecting said exhaust of the cylinder and said return reciprocation, and arranged to then effect a braking action on the moving machine element to stop it, a source of electric current, a plurality of operators' contactors and electric circuit means controlled thereby to effect energization of the valve winding by current from the source, only when all of the contactors are operated, mechanism means moved by the machine element and switch means operated thereby and electric circuit means controlled by the switch means to automatically maintain the valve winding energized and the valve operated independently of the contactors after the machine element has moved through a predetermined portion of a cycle and effecting de-energization of the winding and restoring of the valve when it has substantially completed the cycle.

15. In a safety control system for a machine tool or the like of the type having a cyclically movable machine element and a continuously running motor for driving it, a reservoir source of stored fluid pressure, a fluid pressure cylinder and a piston therein, one of which is stationarily supported and the other of which is rectilinearly reciprocable, conduit means effecting communication between the reservoir and the cylinder, a normally restored electro-magnetically operable valve comprising an operating winding and controlling the conduit means and when in operated condition admitting fluid pressure to the cylinder to effect a forward reciprocation of the reciprocable element and when in normal restored condition opening an exhaust from the cylinder, spring means for effecting an immediate quick return reciprocation when the exhaust is open and immediately exhausting the cylinder, a clutch and a brake comprising circular axially movable clutch and brake friction elements, the clutch element being arranged to be moved into pressure friction engagement and be held in engagement solely by the direct rectilinear action of the fluid pressure effecting said forward reciprocation, and arranged to then effect transmission of motor power to the machine element to drive it, the brake element being arranged to be moved into engagement and held in engagement solely by the direct rectilinear action of the said spring means upon effecting said exhaust of the cylinder and said return reciprocation, and arranged to then effect a braking action on the moving machine element to stop it, a source of electric current, a plurality of operators' contactors and electric circuit means controlled thereby to effect energization of the valve winding by current from the source, only when all of the contactors are operated, mechanism means moved by the machine element and switch means operated thereby and electric circuit means controlled by the switch means to automatically maintain the valve winding energized and the valve operated independently of the contactors after the machine element has moved through a predetermined portion of a cycle and effecting de-energization of the winding and restoring of the valve when it has substantially completed the cycle.

16. In a safety control system for a machine tool or the like of the type having a cyclically movable machine element and a continuously running motor for driving it, a reservoir source of stored fluid pressure, a fluid pressure cylinder and a piston therein, one of which is stationarily supported and the other of which is rectilinearly reciprocable, conduit means effecting communication between the reservoir and the cylinder, a normally restored electro-magnetically operable valve comprising an operating winding and controlling the conduit means and when in operated condition admitting fluid pressure to the cylinder to effect a forward reciprocation of the reciprocable element and when in normal restored condition opening an exhaust from the cylinder, spring means for effecting an immediate quick return reciprocation when the exhaust is open and immediately exhausting the cylinder, a friction clutch for transmitting motor power to the machine element to drive it, a friction brake for stopping the machine element, the brake comprising circular friction elements moved axially out of engagement and the clutch comprising circular friction elements moved axially into and held in engagement directly by the said pressure effected forward reciprocation, and the clutch elements being moved axially out of engagement and the brake elements being moved axially into engagement to stop the machine element by the direct action of said spring means upon exhaust of the fluid pressure from the cylinder, a source of electric current, a plurality of operators' contactors and electric circuit means controlled thereby to effect energization of the valve winding by current from the source, only when all of the contactors are operated, mechanism means moved by the machine element and switch means operated thereby and electric circuit means controlled by the switch means to automatically maintain the valve winding energized and the valve operated independently of the contactors after the machine element has moved through a predetermined portion of a cycle and effecting de-energization of the winding and restoring of the valve when it has substantially completed the cycle.

17. In combination, a machine and a source of power for cyclically moving it, a clutch of the friction surface type for coupling the machine to the source to move it, a brake of the friction surface type for stopping the machine, means to operate the clutch and brake comprising a reservoir of fluid pressure, a cylinder and a piston therein, one of which is stationarily supported and the other of which is rectilinearly reciprocable, conduit means communicating with the cylinder and reservoir, control means comprising a normally restored electro-magnetic valve operable to admit fluid pressure from the reservoir to the cylinder to effect a forward reciprocatory movement of said reciprocatory element, means to communicate said forward movement to the brake and clutch to disengage the brake and engage the clutch and hold it engaged by the action of the fluid pressure in the cylinder, the cylinder having an exhaust outlet therefrom, and the valve when restored opening the exhaust, spring means for effecting return reciprocation of the said reciprocable element and for exhausting the cylinder and for disengaging the clutch and engaging the brake by action of the spring, a source of electric current, electric circuit means and manually controlled means controlling the circuit means to effect said operation and restoring of the valve, means to effect driving of the machine from the power source through the engaged clutch and means to effect braking of the machine through the engaged brake to stop it, and means operated by the machine to maintain the valve operated independently of the manually controlled means after initiation of movement by the manually controlled means and to effect restoring of the valve after substantially a complete cycle of movement of the machine.

18. In combination, a machine and a source of power for operatively cyclically moving it, a mechanically operable clutch for coupling the machine to the source to move it, a mechanically operable brake for stopping the machine, a source of power for operating the clutch and brake comprising a device operable by fluid pressure and a reservoir source of fluid pressure and conduit means communicating with the source and the device, control means therefor comprising a valve having an electro-magnetic operating winding and controlling the conduit means, a pair of current supply mains for supplying current to the valve winding, a plurality of manually controlled contactors and circuit means controlled thereby for controlling energization of the winding by current from the supply mains to effect, when all of the contactors are operated, application of compressed air to the device to operate the brake to release the machine and operate the clutch to start the machine, and the said manually operable contactors, said circuit means, and said valve winding being arranged so that upon restoring of any of the manually operable contactors, the development of an accidental ground connection to one of the said supply mains and a ground connection to the valve winding is prevented from effecting accidental energization of the winding and accidental release of the brake and accidental unexpected operation of the machine.

19. In combination, a machine and a source of power for operatively cyclically moving it, a clutch for coupling the machine to the source to move it, a brake for stopping the machine, a reservoir of fluid pressure, a device comprising a fluid pressure piston and a cylinder having a cylinder outlet, and spring means arranged to operate the clutch and brake, conduit means effecting communication between the cylinder and the reservoir and between the cylinder and the cylinder outlet, control means comprising a magnetic valve having an energizing winding and controlling the conduit means to effect communication of pressure to the cylinder to store energy in the spring and release the brake when the valve winding is energized, and to open the cylinder outlet to effect discharge of the spring and release of the clutch and exhausting of the cylinder and operation of the brake to stop the machine when the winding is de-energized, a pair of current supply mains, a plurality of operable contactors and circuit means controlled thereby for energizing the winding from the mains when the contactors are all closed and for de-energizing it when any of them is open, the said contactors, and said winding and said circuit means being arranged to prevent, when any of the contactors is open, accidental energization of the winding and accidental release of the brake and accidental operation of the machine by a ground connection to the winding and a ground connection to one of said supply mains.

20. In combination, a machine and a source of power for operatively cyclically moving it, a clutch for coupling the machine to the source to move it, a brake for stopping the machine, a reservoir of fluid pressure, a device comprising a fluid pressure piston and a cylinder having a cylinder outlet, and spring means arranged to operate the clutch and brake, conduit means effecting communication between the cylinder and the reservoir and between the cylinder and the cylinder outlet, control means comprising a magnetic valve having an energizing winding and controlling the conduit means to effect communication of pressure to the cylinder to store energy in the spring and release the brake when the valve winding is energized, and to open the cylinder outlet to effect discharge of the spring and release of the clutch and exhausting of the cylinder and operation of the brake to stop the machine when the winding is de-energized, a pair of current supply mains, a plurality of operable contactors and circuit means controlled thereby for energizing the winding from the mains when the contactors are all closed and for de-energizing it when any of them is open, a plurality of switches and switch-circuit means controlled thereby operable to be closed by movement of the machine at a predetermined point in its cycle of movement to maintain the winding energized independently of the manually operable contactors and to be opened to de-energize the winding to effect stopping of the machine at substantially the end of its cycle, said switches, said winding and said switch-circuit means being arranged to prevent, when the switches are open, accidental energization of the winding and accidental release of the brake and accidental operation of the machine by a ground connection to the winding and a ground connection to one of said supply mains.

21. In combination, a machine and a source of power for operatively cyclically moving it, a clutch for coupling the machine to the source to move it, a brake for stopping the machine, a reservoir of fluid pressure, a device comprising a fluid pressure piston and a cylinder having a cylinder outlet, and spring means arranged to operate the clutch and brake, conduit means effecting communication between the cylinder and the reservoir and between the cylinder and the cylinder outlet, control means comprising a magnetic valve having an energizing winding and controlling the conduit means to effect communication of pressure to the cylinder to store energy in the spring and release the brake when the valve winding is energized, and to open the cylinder outlet to effect discharge of the spring and release of the clutch and exhausting of the cylinder and operation of the brake to stop the machine when the winding is de-energized, a pair of current supply mains, a plurality of operable contactors and circuit means controlled thereby for energizing the winding from the mains when the contactors are all closed and for de-energizing it when any of them is open, a plurality of switches and switch-circuit means controlled thereby operable to be closed by movement of the machine at a predetermined point in its cycle of movement to maintain the winding energized independently of the manually operable contactors and to be opened to de-energize the winding to effect stopping of the machine at substantially the end of its cycle, said switches, said winding, said contactors, said circuit means and said switch-circuit means being arranged to prevent, when any of the contactors is open, and said switches are open, accidental energization of the winding and accidental release of the brake and accidental operation of the machine by a ground connection to the winding and a ground connection to one of said supply mains.

22. In a safety control system for a machine tool or the like of the type having a cyclically movable machine element and a continuously running motor for driving it, a reservoir source of fluid pressure, fluid pressure operable mechanism, a magnetic valve having an energizing winding, conduit means communicating with the reservoir and the mechanism and an exhaust outlet from the mechanism opened by the valve respectively and singly upon energizing and de-energizing the winding, clutch elements having circular friction clutch surfaces and brake elements having circular friction brake surfaces, the clutch surfaces being movable axially into engagement upon communication of fluid pressure to the mechanism through the conduit means effected by energization of the winding and then held in pressure driving engagement by the fluid pressure communicated to the mechanism, means to transmit power of the motor to the machine element to drive it through the pressure engaged clutch surfaces, means to move the brake surfaces into pressure engagement upon opening of the outlet effected by de-energization of the winding, means to effect a braking action upon the machine element through the pressure engaged brake surfaces to stop the machine, a source of electric current, a plurality of operators' contactors and electric circuit means controlled thereby to effect energization of the valve winding by current from the source, only when all of the contactors are operated, means moved by the machine element and switch means operated thereby and electric circuit means controlled by the switch means to automatically maintain the valve winding energized and the valve operated independently of the contactors after the machine element has moved through a predetermined portion of a cycle to effect de-energization of the winding and restoring of the valve when it has substantially completed the cycle.

JAMES JOHN MELLON.